May 25, 1926.
J. BLASCHKE
TIRE WHEEL
Filed August 27, 1925
1,586,349
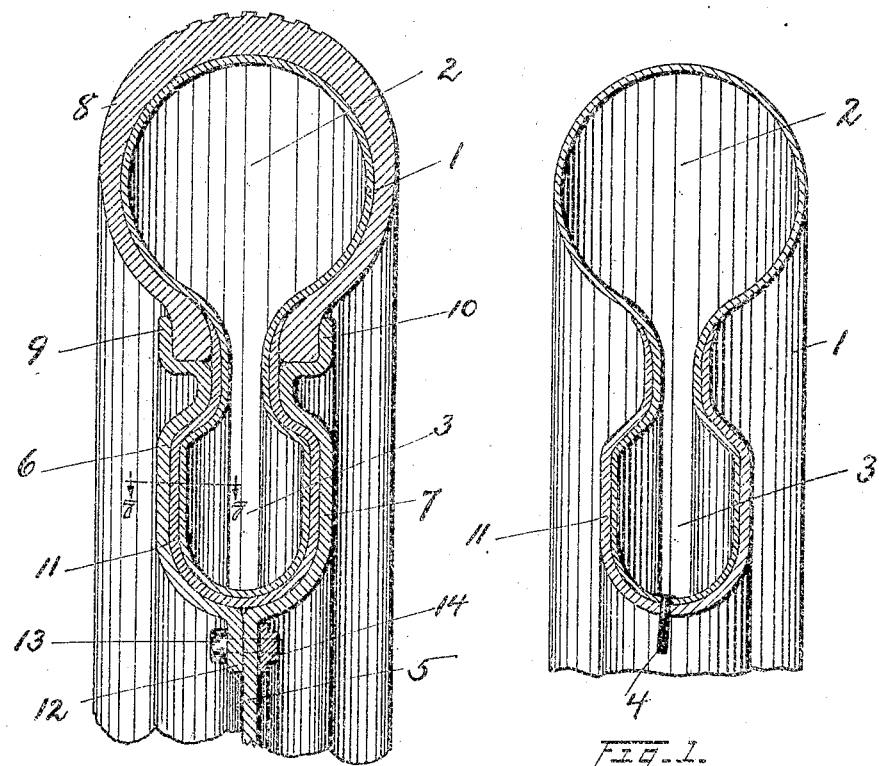
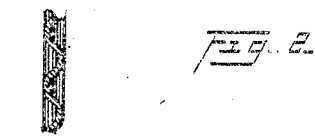
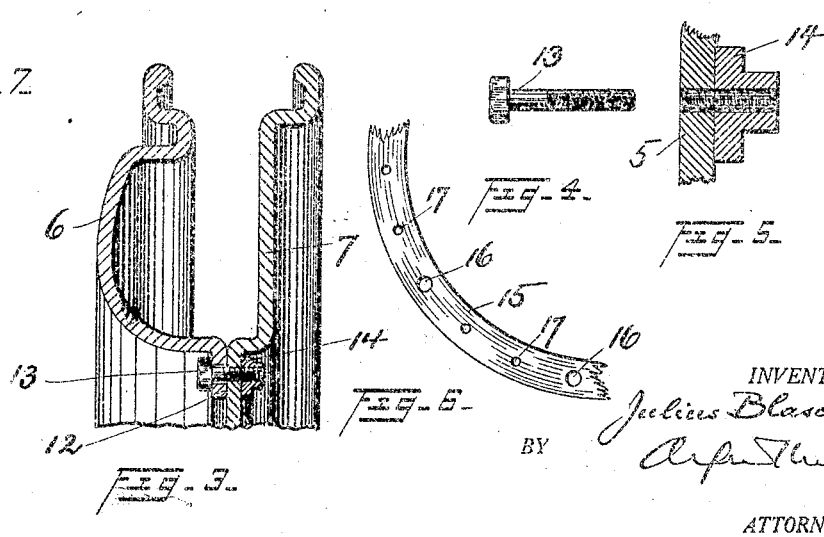
INVENTOR.
Julius Blaschke
BY
ATTORNEY.

Patented May 25, 1926.

1,586,349

UNITED STATES PATENT OFFICE.

JULIUS BLASCHKE, OF BROOKLYN, NEW YORK.

TIRE WHEEL.

Application filed August 27, 1925. Serial No. 52,717.

My invention relates to vehicle wheels and more particularly to pneumatic tires. The object of my invention is to produce a tire which shall have a greater resiliency than the ordinary pneumatic tire now in use and shall be better able to support a load. The tire according to my invention comprises an outer casing formed with a tread surface and an inner tube. The latter is made with two communicating annular air chambers, an outer air chamber extending along the outer circumference of the tire, and an inner air chamber extending along the inner circumference of the tire. To accommodate the inner air chamber, the rim of the wheel is provided with a detachable portion forming with the fixed rim portion an annular compartment adapted to receive the said inner air chamber of the inner tube. It is obvious that by making the inner tube with two air chambers, the volumetric capacity of the inner tube is considerably increased with the result that the tire is given a much greater resiliency than the ordinary tire affording easier riding and also better able to support a load. Further details will appear from the following description of my invention with reference to the drawing wherein Fig. 1 illustrates a portion of the inner tube showing the outer and inner annular air chamber, Fig. 2 a portion of the inner tube of the outer casing and the vehicle rim, Fig. 3 a portion of a modified vehicle rim, Fig. 4 a threaded bolt used for securing the detachable rim portion to the fixed rim portion, Fig. 5 a detail of the wheel rim in section, Fig. 6 a fragment of a washer-ring and Fig. 7 a section along line 7—7 in Fig. 2.

As shown in the drawing, the inner tube 1 is made so as to form two annular air-chambers, an outer air chamber 2 and an inner air chamber 3, both communicating with each other. As shown in Fig. 1 the usual valve 4 is provided for admitting air under pressure to the inside of the tube 1. To accommodate the inner air chamber 3, the rim of the wheel 5 is formed with a detachable portion 6 which together with the fixed rim portion 7 forms an annular compartment adapted to receive the annular inner air-chamber 3 of the inner tube 1, while the outer air-chamber 2 is enclosed by the outer tire casing 8 which is engaged by the peripheral flanges 9 and 10 of the detachable and fixed rim-portions respectively being held in place thereby. The walls of the annular inner air chamber 3 are reinforced as shown at 11 to provide against wear.

The detachable rim portion 6 is formed with a radial flange 12 provided with holes at certain intervals to receive the stems of screw-bolts 13, or the like, used for securing the detachable rim portion 6 to the fixed rim portion 7, which also has holes corresponding to the holes in the radial flange 12. A nut-ring 14 is provided, as shown in Figs. 2 and 3, adapted to receive the threaded stems of the said screw bolts 13. In this way, a very compact and rigid construction of the wheel rim is produced.

If desired, a washer-ring 15, such as shown in Fig. 4 can be used to lie against the radial flange 12 of the detachable rim portion 6 so as to provide a bearing for the heads of the screw-bolts 13. The said nut-ring 15, of course, has holes 16 corresponding in number to the holes in the radial flange 12 of the detachable rim portion, for the stems of the screw-bolts 13 to pass through. In addition to the holes 16, smaller holes 17 are provided in the said washer-ring for rivets to pass through, in case it is desired to permanently secure the washer-ring 15 to the radial flange 12 of a detachable rim-portion 6.

According to Fig. 2, both rim portions 6 and 7 are shaped alike. In the modification illustrated in Fig. 3, the fixed rim portion 7 is formed with a straight wall, whereas the detachable rim portion 6 is a little more bulged out than as shown in Fig. 2. This rim construction is used, where lack of space forbids the fixed rim portion from being made with a bulging wall. Otherwise the manner of securing the detachable rim-portion to the fixed rim-portion is the same as shown in Fig. 2.

The detail cross-section of Fig. 7, is to illustrate that the walls of the rim portions may be corrugated to give them additional strength.

I wish it to be understood, of course, that I do not limit myself to the exact construction as shown, because I may make modifications in my tire within the scope of the claim without departing from the spirit of my invention: For example, the inner chamber of the tire may be made larger so as to extend further toward the hub of the wheel.

I claim as my invention:

In a disk wheel, a single disk, said disk being curved laterally inwardly adjacent its perimeter, thence extending parallel to the body of the disk, thence curved inwardly and outwardly in close proximity to the perimeter defining a rim flange, a separable rim section secured to the disk at the inner terminus of said curved portions of said disk, said separable rim section being curved complementally in cross section to said disk curved portions forming with the curved portions of the disk an annular compartment inwardly from the disk perimeter having a constricted portion in close proximity to the perimeter.

In testimony whereof I affix my signature.

JULIUS BLASCHKE.